(12) United States Patent
Ries et al.

(10) Patent No.: US 9,154,294 B2
(45) Date of Patent: Oct. 6, 2015

(54) RESYNCHRONIZATION METHOD OF A RECEIVED STREAM OF GROUPS OF BITS

(71) Applicant: ST-Ericsson SA, Plan-les-Ouates (CH)

(72) Inventors: Gilles Ries, Saint-Jean-de-Moirans (FR); Abdelaziz Goulahsen, Coublevie (FR)

(73) Assignee: ST-ERICSSON SA, Plan-les-Ouates (CH)

( * ) Notice: Subject to any disclaimer, the term of this patent is extended or adjusted under 35 U.S.C. 154(b) by 0 days.

(21) Appl. No.: 14/375,171

(22) PCT Filed: Feb. 1, 2013

(86) PCT No.: PCT/EP2013/052026
§ 371 (c)(1),
(2) Date: Jul. 29, 2014

(87) PCT Pub. No.: WO2013/124136
PCT Pub. Date: Aug. 29, 2013

(65) Prior Publication Data
US 2014/0369447 A1      Dec. 18, 2014

Related U.S. Application Data

(60) Provisional application No. 61/608,211, filed on Mar. 8, 2012.

(30) Foreign Application Priority Data

Feb. 22, 2012   (EP) .................................... 12305206

(51) Int. Cl.
*H04L 7/04*          (2006.01)
*H04L 7/00*          (2006.01)

(52) U.S. Cl.
CPC .............. *H04L 7/042* (2013.01); *H04L 7/0079* (2013.01); *H04L 7/0083* (2013.01)

(58) Field of Classification Search
CPC ....... H04L 7/042; H04L 7/0083; H04L 1/006; H04L 7/08; H04L 12/2801; H04L 1/004; H04L 1/0041; H04L 1/0045; H04L 1/0057; H04L 1/0065; H04L 1/16; H04L 1/1819; H04L 1/1829; H04L 1/1867; H04L 1/206; H04L 7/0079
See application file for complete search history.

(56) References Cited

U.S. PATENT DOCUMENTS 6,445,719 B1 *   9/2002   Schneider et al. ............ 370/506
6,868,111 B1 *   3/2005   Oleynik ........................ 375/145

(Continued)

FOREIGN PATENT DOCUMENTS

WO        WO2012014365         *   2/2012

OTHER PUBLICATIONS

International Search Report issued in corresponding International application No. PCT/EP2013/052026, date of mailing Apr. 29, 2013.
Written Opinion of the International Searching Authority issued in corresponding International application No. PCT/EP2013/052026, date of mailing Apr. 29, 2013.
Willig, Andreas et al., "Measurements of a Wireless Link in an Industrial Environment Using an IEEE 802.11-Compliant Physical Layer," IEEE Transactions on Industrial Electronics, IEEE Service Center, Piscataway, NJ, vol. 49, No. 6, Dec. 1, 2002, XP011073797, ISSN: 0278-0046.

(Continued)

*Primary Examiner* — Hirdepal Singh
(74) *Attorney, Agent, or Firm* — Patent Portfolio Builders PLLC

(57) ABSTRACT

This invention concerns a resynchronization method by a receiver of a received stream of groups of bits, comprising: detecting a synchronization loss (S10), and then iterating (S11 to S17) checks over different bits until a first bit of a group of bits is found (S14), the most probable first bit being checked first, wherein the checks are iterated in a checking order of bits different from a chronological reception order, so as to check earlier at least one of most probable first bits, different from the most probable first bit, so as to shorten average resynchronization time.

15 Claims, 2 Drawing Sheets

(56) References Cited

U.S. PATENT DOCUMENTS

| | | | |
|---|---|---|---|
| 6,914,637 B1* | 7/2005 | Wolf et al. | 348/473 |
| 2005/0250524 A1* | 11/2005 | Nilsson et al. | 455/509 |
| 2006/0013321 A1* | 1/2006 | Sekiguchi et al. | 375/240.27 |
| 2008/0002797 A1* | 1/2008 | Raman et al. | 375/355 |
| 2008/0013634 A1 | 1/2008 | Lee et al. | |
| 2008/0025452 A1* | 1/2008 | Toda et al. | 375/364 |
| 2008/0134009 A1 | 6/2008 | Febvre et al. | |
| 2013/0060565 A1* | 3/2013 | Nair et al. | 704/201 |
| 2013/0114962 A1* | 5/2013 | Oka et al. | 398/67 |
| 2013/0322462 A1* | 12/2013 | Poulsen | 370/458 |

OTHER PUBLICATIONS

Howlader, M.M.K. et al., "Decoder-Assisted Frame Synchronization of Convolutionally Encoded Packet Transmission," MILCOM 2000, Proceedings of the 21st Century Military Communications Conference, Oct. 22-25, 2000, Piscataway, NJ, IEEE, vol. 2, Oct. 22, 2000, pp. 1114-1118, XP010532073, ISBN: 978-0-7803-6521-6.

Extended European Search Report issued in corresponding European application No. EP 12 30 5206, date of completion Jun. 28, 2012.

* cited by examiner

US 9,154,294 B2

RESYNCHRONIZATION METHOD OF A RECEIVED STREAM OF GROUPS OF BITS

FIELD OF THE INVENTION

The invention relates to resynchronization methods of a received stream of groups of bits.

BACKGROUND OF THE INVENTION

In a communication system, when a bit stream is sent from a transmitter to a receiver, this receiver is often synchronized with the transmitter in order to be able to reconstruct the structure of the received bit stream in a simple and efficient way. Sometimes, it may happen that this synchronization between receiver and transmitter is lost. So, there are methods to resynchronize the receiver with the transmitter.

According to a first prior art, it is known a first type of resynchronization process where both transmitter and receiver cooperate by exchanging messages in order to resynchronize the receiver with the transmitter. If an error is detected at the receiver, a resynchronization process is started, which could last relatively long. Indeed several steps are performed. First a packet is built on the receiver side. Then, this packet is transmitted to the transceiver. Afterwards, the transceiver starts a Synchronization Sequence, which is an easy and predefined sequence of bits, to allow the desynchronized receiver to resynchronize itself with the transmitter. Therefore, the receiver must re-extract the boundaries between groups of bits. To do so, typically, it sequentially probes all the possible boundaries, which means all the N possible boundaries, if the groups of bits each contain N bits. One drawback of this first prior art is that the duration of the sequence is relatively long.

According to a second prior art, it is known a second type of resynchronization process where the receiver alone tries to find back the boundaries between groups of bits to be able to resynchronize by itself with the transmitter. To do so, the receiver chooses a group of a length of N bits, if groups are supposed each to contain N bits. The receiver looks at this N bits group to check if this N bits group is consistent. This test can have two outcomes: either it is consistent or it is not. If this N bits group is consistent, then the receiver has found the good N bits group boundary and the receiver is resynchronized with the transmitter. If this N bits group is not consistent, then the receiver shifts the group of N bits of 1 bit, and retries to see if this new group of N bits is consistent. The receiver iterates this shifting and testing couple of operations until the receiver finds a good group, in a chronological reception of order from the first bit used to start the process. One drawback of this second prior art is that this process is still fairly long. Indeed, the first bit of a group of N bits can be anywhere among the N bits of a group. At best, the good bit is found immediately. At worst, it is found after N iterations. In the average, it is found after N/2 iterations. The N/2 average iterations mean usually about $N^2/2$ bits lost before the synchronization of the receiver with respect to the transmitter is re-acquired. It will be seen later, that even if the starting bit for the process has been chosen as the most probable first bit, it still remains fairly long.

SUMMARY OF THE INVENTION

The object of embodiments of the present invention is to alleviate at least partly the above mentioned drawbacks.

More particularly, embodiments of the invention aim at providing a resynchronization method which in average is shorter than the processes of prior art.

According to some embodiments of the invention, this resynchronization method is performed mainly at receiver side, which means that this resynchronization method is performed either at receiver side only, in most of the cases, and/or at receiver side for most part of this resynchronization method performance, what makes this resynchronization method simpler and/or quicker than the processes performed by close cooperation between transmitter and receiver.

Besides, for some transmission protocols, the errors are not corrected and the least bits contain errors, the better is the final quality of the data received at receiver level. For those transmission protocols, the quickest resynchronization method according to embodiments of the invention is all the more needed and all the more efficient.

According to some embodiments of the invention, this resynchronization method proposes, when an error is detected on N bits groups, to probe the surrounding combination, following an algorithm as a sequence of the most probable first bit, to try to converge statistically, the fastest possible.

According to some embodiments of the invention, this resynchronization method proposes an expected value of the convergence time which can be shown as being the shortest possible, leading to the minimal average of bits lost before the resynchronization is achieved.

According to some embodiments of the invention, communication is performed at a low level, for example at layer one of OSI reference model. Then, some higher level protocols that enclose the low level protocol, may not try to correct errors. In that case, the shortest the resynchronization of the low level communication canal, the least incorrect bytes are forwarded from this low level protocol to the higher level protocols, and the least incorrect applicative data will be impacted by the low level error.

This object is achieved with a resynchronization method by a receiver of a received stream of groups of bits, comprising detecting a synchronization loss, and then iterating checks over different bits until a first bit of a group of bits is found, the most probable first bit being checked first, wherein the checks are iterated in a checking order of bits different from a chronological reception order, so as to check earlier at least one of most probable first bits, different from the most probable first bit, so as to shorten average resynchronization time.

Preferred embodiments comprise one or more of the following features:
  at least several most probable first bits, different from the most probable first bit, are checked earlier than they would have been checked in a chronological reception order.
  the checking order goes from the most probable first bit to the less probable first bit.
  thanks to difference between checking order and chronological reception order only, the average resynchronization time is at least 25% shorter, preferably at least 50% times shorter.
  said checking order starts from one bit and then takes alternatively one bit on one side of said starting bit and one bit on the other side of said starting bit.
  the most probable first bits are deduced from the bits for which an error is the more likely to have occurred and from the correctly received groups of bits preceding said detected synchronization loss.
  the bits for which an error is the more likely to have occurred, are: firstly, the bit for which a local interference may have occurred, resulting in an inversion of a single bit in the stream, secondly, the bit(s) for which a clock recovery error may have occurred, resulting in an insertion or a suppression of a single bit inside the stream, then, the other bits.

all groups of bits in the stream comprise the same predetermined number of bits and the number of iterated checks is equal to or less than said predetermined number.

said same predetermined number of bits is equal to or more than eight bits.

a group de bits comprising several information bits and at least one or more redundancy bit(s), detecting a synchronization loss is performed by controlling that one or more groups of bits is or are not consistent group(s).

each iterated check over a bit comprises:
  a reconstruction of a group of bits compensated for a presumed error having occurred on said bit,
  a control of the consistency of said reconstructed group,
  a confirmation of said presumed error if reconstructed group is consistent,
  a stop of the checking in case of confirmation or going to next iterated check in case there is no confirmation.
a confirmed presumed error is definitely validated if said presumed error can be confirmed over at least one or more next group(s) of bits.

said received stream of groups of bits has been transmitted on a serial link using a protocol at layer one of Open Systems Interconnection Reference Model.

said received stream of groups of bits has been transmitted on a serial link using M-PHY technology.

This object is also achieved with a receiver comprising a detector adapted to detect a synchronization loss in a received stream of groups of bits, a checking unit adapted to iterate checks over different bits until a first bit of a group of bits is found, the most probable first bit being checked first, wherein said checking unit is adapted to iterate checks in a checking order of bits different from a chronological reception order, so as to check earlier at least one of most probable first bits, different from the most probable first bit, so as to shorten average resynchronization time.

According to some embodiments of the invention, the stream of groups of bits represents the pixel data flow of an image, the groups of bits representing the pixel data.

Further features and advantages of the invention will appear from the following description of embodiments of the invention, given as non-limiting examples, with reference to the accompanying drawings listed hereunder.

DETAILED DESCRIPTION OF THE INVENTION

Figure 1:
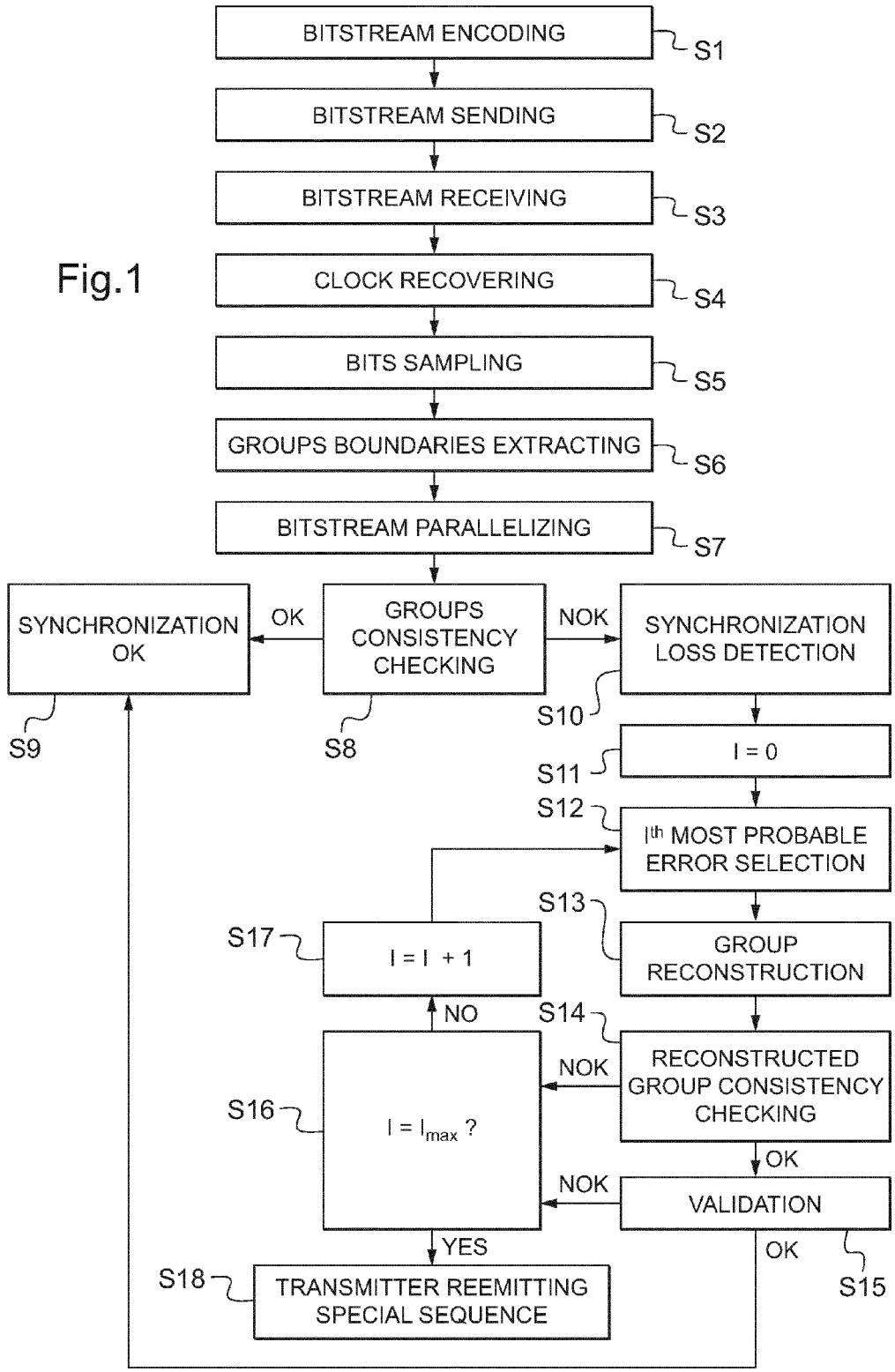
FIG. 1 shows an example of steps of the resynchronization method according to some embodiments of the invention.

FIG. 1 shows an example of steps of the resynchronization method according to some embodiments of the invention.

All groups of bits in the stream comprise the same predetermined number of bits. Each bit is only checked once. The number of iterated checks is equal to or less than this predetermined number. Preferably, this same predetermined number of bits is equal to or more than eight bits. A group de bits comprises several information bits and at least one or more redundancy bit(s). This consistent group of bits comprising information bits and redundancy bit(s) may be called a word. In the following text, word or group or group of bits will be used for such a consistent group of bits. Detecting a synchronization loss is performed by controlling that one or more groups of bits is or are not consistent group(s).

Resynchronization method will hereby be described with respect to a MPHY communication canal, but another communication canal can be used. A MPHY transmitter sends data via a bit stream to a MPHY receiver who is synchronized with the MPHY transmitter.

Resynchronization method comprises, a step S1 of bit stream encoding, a step S2 of bit stream sending, a step S3 of bit stream receiving, a step S4 of clock recovering, a step S5 of bits sampling, a step S6 of groups boundaries extracting, a step S7 of bit stream parallelizing, a step S8 of groups consistency checking, a step S9 of synchronization correct, a step S10 of synchronization loss detection, a step S11 of increment I reset for iteration, a step S12 of selecting the $I^{th}$ most probable error, a step S13 of group reconstruction, a step S14 of reconstructed group consistency checking, a step S15 of validation, a step S16 of increment maximum $I_{max}$ testing, a step S17 of incrementing I by one unit, a step S18 of the transmitter reemitting a special sequence for resynchronization.

In step S1, the transmitter is first pushed-in bytes, each byte containing 8 bits, to be transmitted on the communication canal to a receiver. A higher level of the protocol in the transmitter has serialized the packets into bytes, to then provide the bytes for encoding. Then the transmitter encodes the 8 bits onto 10 bits, thereby adding an equivalent 2 bits of redundancy, and at the same time, insures enough bit transitions to allow for recreating a clock at the received side.

In step S2, the transmitter sends the 10 bits serially across the link constituting the communication canal. Such groups of 10 bits are sent one after the other to constitute a bit stream circulating between the transmitter and the receiver.

In step S3, the receiver receives a sequence of bits, which is the concatenation of the transmitted 10 bits words.

In step S4, the receiver recreates a bit-clock from the seen bit oscillations, thanks to a Clock-Recovery mechanism contained in the receiver.

In step S5, the receiver uses the recovered clock to sample the received bits.

In step S6, the receiver extracts the 10 bits word boundaries thanks to a synchronization protocol.

In step S7, the receiver parallelizes the received bit stream into words of 10 bits, each word containing 10 bits. A higher level of the protocol at the receiver recreates the packets from the received bytes.

In step S8, the receiver decodes the 10 bits towards the 8 information bits, checking that the 10 bits are consistent by using the 2 redundant bits contained in the word of 10 bits. Two results of this checking operation are possible: either the 10 bits are consistent or they are not. If the words of 10 bits are consistent, then the resynchronization method goes to step S9. If the words of 10 bits are not consistent, then the resynchronization method goes to step S10.

In step S9, the synchronization is correct. It means that either the synchronization has not been lost, when the method comes from step S8, or that the lost synchronization has been found again, i.e. that the receiver is resynchronized with the transmitter, when the method comes from step S15.

In step S10, the receiver detects a synchronization loss because at least one or more groups of 10 bits was or were not consistent. In that case, the method will start an iteration cycle including steps S11 to S17. During this iteration cycle, all bits of a word will be tried successively until the good one is found, that is the effective first bit of a word.

The bits will be tried in a non chronological order, which is an order different from the strictly chronological order. This non chronological order goes from the most probable first bit among all bits of a word to the less probable first bit among all bits of the word. This order is preferably followed until the real first bit is found. This way, the average resynchronization time will be shortened. This checking order can be followed for only a part of the tested bits of a word. Then, at least several most probable first bits are checked earlier than they would have been checked in a chronological reception order. That way, the average resynchronization time will be shortened too, but however it will be less shortened. Preferably, thanks to difference between checking order and chronological reception order only, the average resynchronization time is at least 25% shorter, preferably at least 50% shorter. In a preferred embodiment, the checking order starts from one bit and then takes alternatively one bit on one side of said starting bit and one bit on the other side of said starting bit.

In step S11, the increment I is reset to zero.

In step S12, for each round I of increment, the $I^{th}$ most probable error will be selected. For I=0, the method will start looking for the most probable error and then will deduce the most probable first bit of a word to be checked first as a potential group boundary. Afterwards, for I=1, the method will look for the second most probable error and then deduce the second most probable first bit, and so on . . . .

The most probable first bits are deduced from the bits for which an error is the more likely to have occurred and from the correctly received groups of bits preceding the synchronization loss. The bits for which an error is the more likely to have occurred are considered to correspond to the errors statistically happening more often. The strategy used in the method is based on a statistical analysis of the cause of the disturbance, which creates an error at the receiver. The first main cause of error is a local interference (ESD, . . . ), which results in the inversion of a single bit. The second main cause of error is a clock recovery issue, where the clock shifts slightly of frequency, and looses its lock of phase on the incoming bit stream. The result is the insertion or suppression of a single bit inside the bit stream. In case of the suppression or insertion of a bit, all bits that follow the inserted or suppressed bit, without an end, are shifted 'left' or 'right' of 1 bit. As a consequence, all the 10 bits words which are extracted from the bit stream contain 9 bits of an initial word and 1 bit of another word, so that all words appear totally false. Then, the whole word sequence of the bit stream becomes totally false, like random, indefinitely, until the receiver is able to resynchronize and extract again the correct 10 bits word boundaries. Then the other causes of error are much less likely.

In step S13, once the $I^{th}$ most probable error has been selected, this presumed error is compensated for and the corresponding 10 bits correct word is reconstructed. For example, for I=0, a 10 bits word is reconstructed to compensate for the impact of the presumed most probable error. Then, in another iteration, for I=1, a 10 bits word is reconstructed to compensate for the impact of the presumed second most probable error, and so on . . . .

In step S14, the consistency of that reconstructed word is checked. The corresponding $I^{th}$ most probable first bit is checked, to know whether it is indeed a group boundary or not. Either the reconstructed word is consistent and the method goes to step S15, or the reconstructed word is not consistent and the method goes to step S16.

In step S15, the group boundary that has been found in step S14 is test to be validated over a few next words. Either it is validated and the method goes to step S9, or it is not validated and the method goes to step S16.

In step S16, since the last checked potential most probable first bit is indeed no effective first bit, then the method tests if all potential first bits have been checked or not. Either all potential first bits have been checked and the method goes to step S18, or there are still potential first bits to be checked and the method goes to step S17.

In step S17, index I is incremented by one unit. It means that if I=0 was the last iterated round in the iteration cycle, then I=1 for iterating the next round. If I=1 was the last iterated round in the iteration cycle, then I=2 for iterating the next round and so on . . . . At end of step S17, the method goes back to step S12 with a by one unit incremented value of I.

In step S18, all potential first bits have been checked and none has been found as being indeed a first bit. Still, the receiver knows there has been an error, because the 10 bits of one or more words are inconsistent. This situation will happen seldom; however it may happen. Indeed, it will happen when for example two errors have happened simultaneously or at least within the same word. For example there have been simultaneously in the same word a local interference and a clock recovery issue. Or, for example there have been simultaneously in the same word two local interferences. Then, as in first prior art, the receiver will ask the transmitter to reemit a special sequence in order to help him resynchronize with the transmitter. This time, resynchronization will be long, but this situation will happen very seldom.

Figure 2:
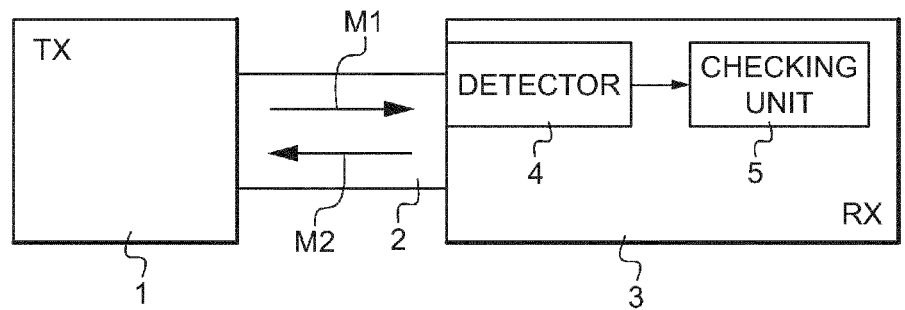
FIG. 2 shows an example of a transmission system including a receiver according to some embodiments of the invention.

FIG. 2 shows an example of a transmission system including a receiver according to some embodiments of the invention. The receiver described with respect to FIG. 2 may be used to implement the method described with respect to FIG. 1. A transmitter 1 and a receiver 3 communicate through a communication canal 2 by sending and receiving bytes. The transmitter 1 sends over the communication canal 2 a bit stream M1 towards a receiver 3. The receiver 3 may send a request M2 towards the transmitter 1 in step S18 of the method described with respect to FIG. 1.

The receiver 3 comprises at least a detector 4 and a checking unit 5. The detector 4 is adapted to detect a synchronization loss in a received stream of groups of bits coming from the transmitter 1. The checking unit 5 is adapted to iterate checks over different bits until a first bit of a group of bits is found. The checking unit 5 is also adapted to iterate checks in a checking order of bits different from a chronological reception order, so as to check earlier at least one of most probable first bits, so as to shorten average resynchronization time.

Preferably, the received stream of groups of bits is transmitted on a serial link 2 using a protocol at layer one of Open Systems Interconnection (OSI) Reference Model. This received stream of groups of bits has then been transmitted on a serial link 2 using M-PHY technology, working at a few Gigabits per second. This serial link 2 can be used for high speed serial inter-chip connections.

Figure 3:
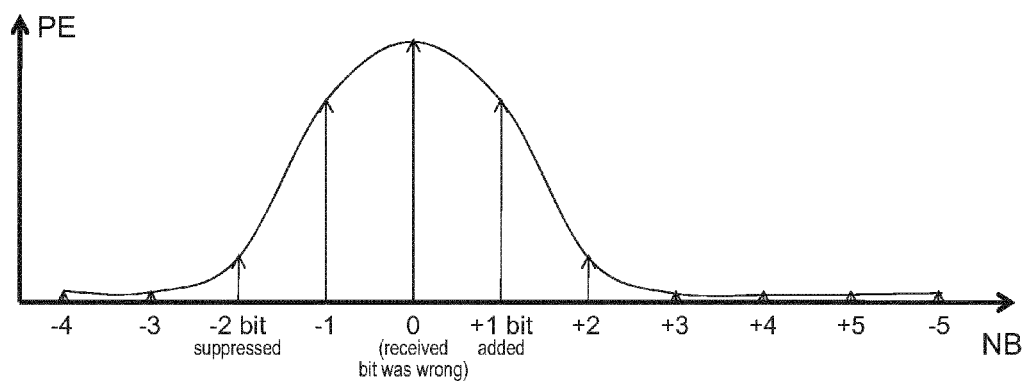
FIG. 3 shows a curve showing an example of a probability error occurrence with respect to the number of inserted or suppressed bits in a bit stream.

FIG. 3 shows a curve showing an example of a probability error occurrence with respect to the number of inserted or suppressed bits in a bit stream. Here, the chosen example is a Gaussian curve of error probability for sake of simplicity. If this curve may not represent in exact detail a real curve of error probability, this curve is rather representative of error probability in reality, which means this curve is rather close to a real error probability curve. The error probability PE is represented on a vertical axis, with respect to the number NB of the bit concerned by the error that has happened. Bit numbered 0 corresponds to the local error having happened on the bit detected as a wrong bit. Bit numbered +1 corresponds to one bit added in the bit stream due to a clock recovery issue. Bit numbered −1 corresponds to one bit suppressed in the bit stream due to a clock recovery issue. Bit numbered +2 corresponds to two bits added in the bit stream, whereas bit numbered −2 corresponds to two bits suppressed in the bit stream, and so on . . . . Clearly, as already explained earlier, the most likely is a local error on the bit detected as wrong. Then the more likely is one bit added or suppressed, and so on . . . . These error probabilities can be seen more accurately in a table 1 shown below.

The below table 1 is an example of the expected Gaussian error occurrence. The provided probabilities do not represent exact reality, but are representative of reality.

TABLE 1

| bits added/suppressed | −4 | −3 | −2 | −1 | 0 | +1 | +2 | +3 | +4 | +5 | −4 | −3 | −2 | −1 | total |
|---|---|---|---|---|---|---|---|---|---|---|---|---|---|---|---|
| error probability | 2% | 3% | 5% | 20% | 39% | 20% | 5% | 3% | 2% | 1% | 2% | 3% | 5% | 20% | |
| bad trial sequence | 0 | 0 | 0 | 0 | 0 | 1 | 2 | 3 | 4 | 5 | 6 | 7 | 8 | 9 | |
| bad trial mean duration | 0 | 0 | 0 | 0 | 0 | 0.2 | 0.1 | 0.09 | 0.08 | 0.05 | 0.12 | 0.21 | 0.4 | 1.8 | 3.05 |
| good trial sequence | 8 | 6 | 4 | 2 | 0 | 1 | 3 | 5 | 7 | 9 | 0 | 0 | 0 | 0 | |
| good trial mean duration | 0.16 | 0.18 | 0.2 | 0.4 | 0 | 0.2 | 0.15 | 0.15 | 0.14 | 0.09 | 0 | 0 | 0 | 0 | 1.67 |

The first column of the table 1 represents the content of the lines explained in plain words. All other columns, but the last one, represent parameters linked to the number of the type of error that may have occurred. The last column will represent the total duration mean for lines 4 and 6 of table 1.

The first line represents the number of the type of error that may have occurred. The bit detected as wrong corresponds to 0. One bit added corresponds to +1, whereas one bit suppressed corresponds to −1. Two bits added correspond to +2, whereas two bits suppressed correspond to −2, and so on . . . .

The second line represents the associated error probability.

The third line represents the bad trial sequence checking corresponding to a chronological order of checking. This chronological order would correspond to second prior art in which the first checked bit is not chosen at random but is chosen as the most probable first bit. This chronological order still leads to a rather long average resynchronization time.

The fourth line represents the bad trial mean duration, which is function of the error probability and of the associated checking rank. The later a high probability error is checked, the longer the resynchronization average time will be. The fourth line corresponds to the multiplication of the second line by the third line. The last column of this fourth line corresponds to the total of all preceding columns (but the first one) of this fourth line: it represents the value of the resynchronization average time when the chronological order is respected.

The fifth line represents the good trial sequence checking corresponding to a non chronological order of checking as in a preferred embodiment of the invention. This non chronological order corresponds to an order in which all bits are checked in a decreasing order of probability. In embodiments of the invention, at least one of the most probable first bits, different from 0, for example +1, or for example −1, or even for example +2, is checked earlier than in a chronological order.

The sixth line represents the good trial mean duration, which is function of the error probability and of the associated checking rank. The earlier a high probability error is checked, the shorter the resynchronization average time will be. The sixth line corresponds to the multiplication of the second line by the fifth line. The last column of this sixth line corresponds to the total of all preceding columns (but the first one) of this sixth line: it represents the value of the resynchronization average time when the non chronological order according to a preferred embodiment of the invention is respected.

As it can be seen from table 1, the average duration of the bad sequential search from 0 bit onward costs a mean duration of 3.05 searches, while with the optimized search according to a preferred embodiment of the invention, it costs only 1.67 searches. For this example set of probability, there is thus a gain of nearly a factor two when going from the pre-defined chronological order to a probability optimized order as the one according to a preferred embodiment of the invention.

The benefit of this preferred embodiment of the invention is not limited to this nearly twice shorter resynchronization average time. Indeed, when the data that are conveyed are pixel data, the impact, visually, will be either a short horizontal segment of fake pixels, or a nearly twice longer segment in average. Under the assumption that shorter segments remain more or less invisible, while longer segments are quite visible, then the difference is even higher. For instance, the longest segment which has a length corresponding to 9 cycles, while using the bad chronological order, has about 20% chances of occurrence, whereas this same longest segment, while using the good non chronological order according to the preferred embodiment of the invention has about 1% chances of occurrence. This longest segment, long of 9 cycles, will thus appear on screens about 20 times less with the good non chronological order according to the preferred embodiment of the invention than with the chronological order.

The invention has been described with reference to preferred embodiments. However, many variations are possible within the scope of the invention.

The invention claimed is:

1. A resynchronization method performed by a receiver of a received stream of groups of bits, the method comprising:
   detecting a synchronization loss, and then
   iterating checks over different bits until a first bit of a group of bits is found, a most probable first bit being checked first, the checks being iterated in a checking order of the bits that is different from a chronological reception order, to check earlier at least one bit among bits most probable to be first bits of the groups, the at least one bit being different from the most probable first bit, so as to shorten average resynchronization time.

2. The resynchronization method according to claim 1, wherein:
   at least several among the bits most probable to be first bits, different from the most probable first bit, are checked earlier than they would have been checked in the chronological reception order.

3. The resynchronization method according to claim 1, wherein:
the checking order goes from the most probable first bit to a bit least probable to be a first bit.

4. The resynchronization method according to claim 1, wherein:
the average resynchronization time when the checking order is used is at least 25% shorter, preferably at least 50% shorter than the average resynchronization time when the chronological order is used.

5. The resynchronization method according to claim 1, wherein:
said checking order includes checking a starting bit and then checking one bit on one side of said starting bit and one bit on the other side of said starting bit.

6. The resynchronization method according to claim 1, wherein:
the bits most probable to be first bits are deduced from bits for which an error is more likely to have occurred and from correctly received groups of bits preceding said detected synchronization loss.

7. The resynchronization method according to claim 6, wherein the bits for which an error is more likely to have occurred include:
a bit for which a local interference may have occurred, resulting in an inversion of a single bit in the stream, and
bit(s) for which a clock recovery error may have occurred, resulting in an insertion or a suppression of a single bit inside the stream.

8. The resynchronization method according to claim 1, wherein:
all groups of bits in the stream comprise a same predetermined number of bits and a number of iterated checks is equal to or less than said predetermined number.

9. The resynchronization method according to claim 8, wherein:
said same predetermined number of bits is equal to or more than eight bits.

10. The resynchronization method according claim 1, wherein:
each group of bits includes several information bits and at least one or more redundancy bit(s), and detecting the synchronization loss is performed by controlling that one or more groups of bits is or are not consistent group(s).

11. The resynchronization method according to claim 10, wherein:
each iterated check over a bit comprises:
a reconstruction of a group of bits compensated for a presumed error having occurred on said bit,
a control of the consistency of said reconstructed group,
a confirmation of said presumed error if reconstructed group is consistent, and
a stop of the iterated checks if said presumed error is confirmed or going to a next iterated check if said presumed error is not confirmed.

12. The resynchronization method according to claim 11, wherein:
a confirmed presumed error is definitely validated if said presumed error is confirmed over at least one or more next group(s) of bits.

13. The resynchronization method according to claim 1, wherein:
said received stream of groups of bits has been transmitted on a serial link using a protocol at layer one of Open Systems Interconnection Reference Model.

14. The resynchronization method according to claim 13, wherein:
said received stream of groups of bits has been transmitted on a serial link using M-PHY technology.

15. A receiver comprising:
a detector configured to detect a synchronization loss in a received stream of groups of bits, and
a checking unit configured to iterate checks over different bits until a first bit of a group of bits is found, a most probable first bit being checked first, said checking unit is configured to iterate checks in a checking order of bits different from a chronological reception order, so as to check earlier at least one bit among bits most probable to be first bits of the groups, the at least one bit being different from the most probable first bit, so as to shorten average resynchronization time.

\* \* \* \* \*